United States Patent Office 2,867,571
Patented Jan. 6, 1959

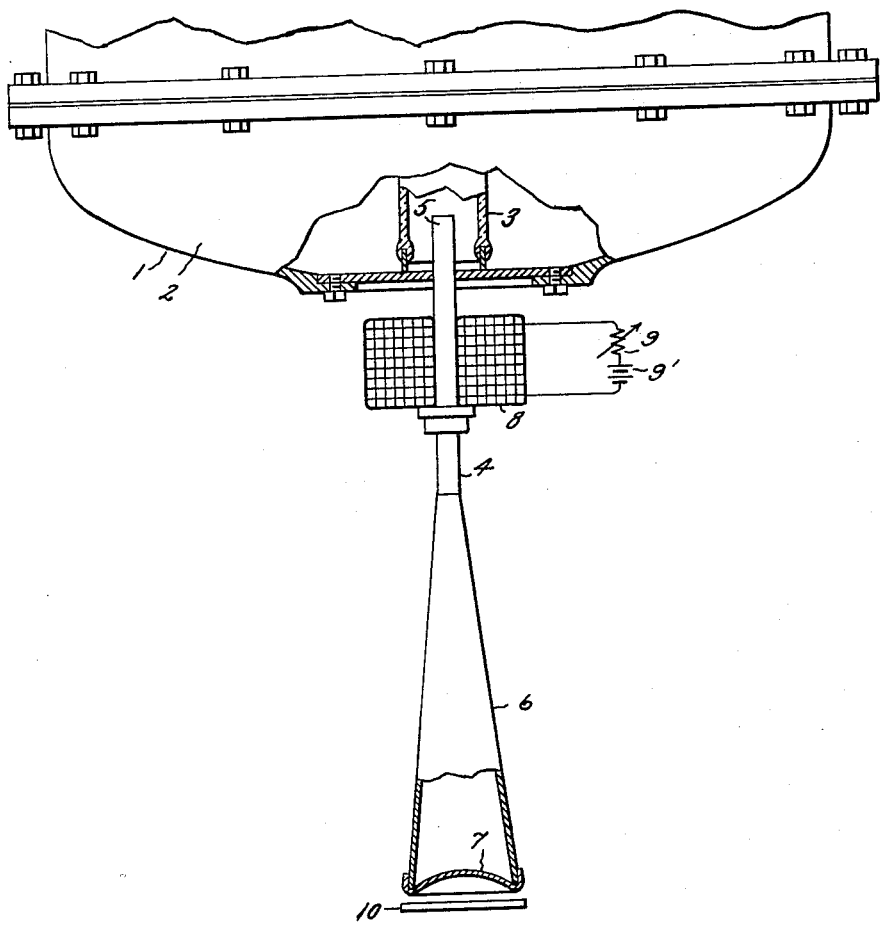

2,867,571

DEPOLYMERIZATION OF HIGH MOLECULAR WEIGHT DEXTRAN

Winthrop D. Bellamy, Schenectady, N. Y., assignor to General Electric Company, a corporation of New York Application September 30, 1953, Serial No. 383,244

2 Claims. (Cl. 204—154)

This invention relates to the production of low molecular weight dextran suitable for the production of clinical dextran by depolymerizing native dextran by electron irradiation thereof.

The term "dextran" as broadly used, refers to polymers of glucose in which at least 60 percent of the glucosidic bonds are $\alpha 1,6$. A form of dextran known as "native dextran" has been shown by several investigators to be enzymatically produced by enzymes liberated by *L. mesenteroids* acting on sucrose and also to be produced by another bacteria, *Leuconostoc sp.* For example, Bixler et al., Industrial and Engineering Chemistry, pages 692–705, April 1953, summarize the production of "native dextran" by one process to be as follows:

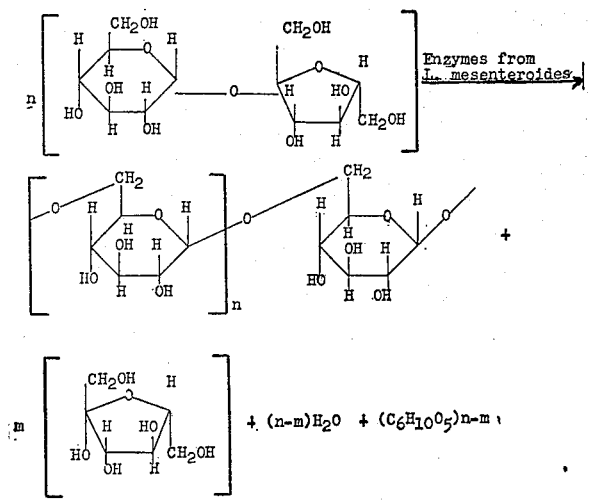

Dextran as produced by the bacterium is called "native dextran," and has a molecular weight of several million to several hundred million. Similarly to "native dextran," lower molecular weight dextran, in addition to its clinical use, is useful as a thickener for example in cosmetic manufacture, in oil well drilling compounds, plasticizers, paper coatings, textile printing and foods. A more important utility for depolymerized dextran is as a blood plasma volume expander in a form known to the art as clinical dextran and having an average molecular weight of about 75,000. Specifically, fractions of dextran in the molecular weight range of 25,000 to 100,000 have been found to be useful as blood volume extenders.

Various methods have been employed to split the high molecular weight "native dextran" to smaller fragments, for example, the hydrolytic method disclosed in U. S. Patent 2,437,518 to Gronwall et al. By this method, clinical dextran is separated from the hydrolyzed "native dextran" by fractional precipitation with organic solvents, dried and bottled. Other methods of producing lower molecular weight dextran in the clinical range are, for example, by controlled thermal depolymerization of dextran as described by Wolff et al., Industrial and Engineering Chemistry, pages 755–759, April 1953, and by various ultrasonic and enzymatic processes.

While the aforedescribed methods for producing lower molecular weight dextran are satisfactory insofar as product quality are concerned, they are quite costly because of the required number of production steps.

A principal object of the present invention is to easily and economically produce dextran having a molecular weight within the clinically useful range.

Other objects of the invention will become more apparent as the description thereof proceeds.

Unexpectedly, I have now discovered that I can produce a low molecular weight dextran suitable for clinical use simply and economically by subjecting "native dextran" to the depolymerization effect of high energy electrons. By means of my invention it is possible to produce greater yields of dextran within the clinical range per pound of native dextran more cheaply than by known methods.

The invention itself, together with further objects and advantages thereof, may best be understood by reference to the following description taken in connection with the accompanying drawing in which the single figure is a partially sectionalized, simplified view of accelerator apparatus useful in connection with the invention.

Referring particular now to the single figure of the drawing there is shown a high voltage accelerating apparatus capable of producing a beam of high energy electrons for irradiating unconverted "native dextran" in accordance with the invention. High voltage accelerating apparatus 1 may be of the type disclosed in United States Patent No. 2,144,518 to Willem F. Westendorp, dated January 17, 1939, and assigned to the assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 16, pp. 128–133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic field generating winding 8 energized by a source of direct current 9' through a variable resistor 9.

In producing lower molecular weight dextran according to my invention, dry dextran contained in sealed containers, preferably of polyethylene, is placed in the path of the electrons emerging from end-window 7 as illustrated. The electrons penetrate the starting dextran to a depth dependent upon their energy and effect depolymerization as above mentioned. As will be apparent to those skilled in the art, other suitable containers may also be employed or the dextran open to the air may be placed on a continuous belt. It is also within the contemplation of the invention that containers of unirradiated dextran can be passed continuously under end-window 7 at a velocity selected to give the desired irradiation dosage to effect depolymerization. In certain instances it may be desirable to irradiate the native dextran in an atmosphere of nitrogen, argon, helium, krypton or xenon, etc., to prevent effects from any corona.

Native dextran has a molecular weight greater than $10^6$ and differs from starch and glycogen in being very slowly digested by humans. Unlike cellulose, it is soluble in water. The fractions of dextran which have these same properties and which have been found eminently suitable as blood volume extenders are those whose average molecular weights fall within the range 25,000 to 100,000. Various methods of determining the molecular weight of high polymeric materials such as dextran fractions suitable for clinical use, are available, for instance by the sedimentation and diffusion value determinations described in U. S. Patent 2,437,518. However, I have used the official army procedure for the examination of clinical dextran as given in the National Bureau of Standards Report No. 1713, June 13, 1952, "Molecular Properties of Plasma Substitutes," by S. G. Weissberg and H. S. Isbell. These methods include viscosity, light scattering and end group analysis. Since both light scattering and end group analysis give absolute values stated as weight average molecular weights and not relative numbers, they have been chosen by the U. S. Bureau of Standards as the official assay methods for clinical dextran. On the other hand, viscosity measurements give relative values which are calibrated in terms of the light scattering results.

In order to depolymerize the starting "native dextran" to a product having a weight average molecular weight range suitable for the preparation of dextran for clinical use, I have found that best results have been obtained by irradiating the starting dextran with a dose of approximately $10^7$ Roentgen units. However, a wider range of $10^6$ and $10^8$ Roentgen units may be used. A Roentgen unit as usually defined is the amount of radiation that produces one electrostatic unit of ion pairs per millimeter of dry air under standard conditions and, as employed here, refers to the amount of electron radiation measured with an air equivalent ionization chamber at the position of the upper surface of the dextran container.

In order that those skilled in the art may better appreciate how the present invention may be practiced, the following examples are given by way of illustration and not by way of limitation. All parts are by weight.

EXAMPLE 1

Employing the accelerator apparatus illustrated in Figure 1 and described above, a series of polyethylene envelopes, each containing approximately 15 grams of native dextran, were passed on an endless belt under end-window 7 for a period and at a rate adjusted so that each received a dose of $10^7$ Roentgen units. A batch of approximately 2,000 grams of irradiated dextran was collected and subsequently decolorized as follows:

2 parts of irradiated dextran having a pH of about 10.2 were suspended in 50 parts of water at 45° C. for 30 minutes giving a brownish yellow colored suspension. A uniform suspension was obtained by occasional shaking. After cooling, the pH was adjusted to 5.0 with normal HCl and 2 parts of a decolorizing charcoal and 2 parts of a filter aid were added. The mixture was autoclaved at 15 p. s. i. g. for 15 minutes, cooled, filtered and the pH adjusted to 5.0. Reautoclaving with additional charcoal and filter aid for a similar period resulted in a clear and nearly colorless product. Reautoclaving for a third time at a pH of 6.0 resulted in a colorless product.

The weight average molecular weight of the above obtained depolymerized dextran was determined to be $1.9 \times 10^5$ by the light scattering technique described in the aforesaid Bureau of Standards Report No. 1713. However, before the irradiated dextran can be prepared for clinical usage, it is necessary to separate from the entire irradiated product a fraction of dextran having molecules correctly sized for clinical use, for example, 25,000 to 100,000 or higher. Conventional methods of separating materials having different molecular weights from a mixture may be utilized, for example, fractional precipitation. By this method, clinical dextran is separated from the irradiated product by fractional precipitation with an organic solvent, for example, a lower monohydric aliphatic alcohol such as methanol, ethanol, propanol, butanol, etc. Generally, a first fraction containing mostly high molecular weight dextran outside the clinical range is precipitated. This fraction is added to a crude batch of native dextran for irradiation or it can be reirradiated separately. Adding an additional amount of solvent causes a second fraction having a molecular weight approximately in the clinical range to precipitate. A third fraction composed mostly of low molecular weight dextran is the last fraction. The dextran fraction within the clinical range can easily be prepared for clinical use by following any of the methods now available to the art, for example, according to the method outlined in the aforesaid Bixler et al. article.

In the following examples, tabulated in Table 1, three methods, including the aforesaid light scattering method, of analyzing dextran samples irradiated with varying doses were used. Of these methods, $M_w$ viscosity is a relative value obtained from the following theoretical formula:

$$M_w^{1/2} = [\eta] \times 10^3$$

The third method was by end-group analysis according to the method of Smogyi, Biol. Chem., vol. 160, pages 61–68, 1945. This last mentioned method for determining end-groups and the number average molecular weight, ($M_n$) is actually a method used to estimate reducing sugars and is based upon the assumption that equimolecular quantities of dextran and isomaltose (6-α-d-glucosyl-d-glucose) have the same reducing power. In comparing the results it is important to consider the fact that each batch of native dextran does not have the same initial molecular weight. Also of importance in comparing $M_w$ light scattering and $M_w$ viscosity, it must be remembered that $M_w$ light scattering gives absolute values whereas $M_w$ viscosity gives relative values.

The number averaged ($M_n$) emphasizes each molecule equally while the weight average ($M_w$) emphasizes the larger molecules more than the smaller molecules. The formulae for determining these values wherein $N_i$ is equal to number of molecules of molecular weight $M_i$ are as follows:

$$M_n = \Sigma \frac{N_i M_i}{N_i}$$

$$M_w = \frac{\Sigma N_i M_i^2}{\Sigma N_i N_i}$$

If all of the molecules were of the same size, $M_n$ would be equal to $M_w$, $M_n = M_w$. However, since all high polymeric materials are not of a single molecular species, these two averages are not the same and the difference is an indication of the breadth of molecular weight distribution.

In the following examples, the energy of the irradiating electrons was adjusted to 800,000 electron volts peak. The results obtained are disclosed in Table I:

Table I

| Exampe | Dose, Roentgen units | $M_w$ light scattering | $[n]$ | $M_w$ viscosity [1] | $M_n$ [2] |
|---|---|---|---|---|---|
| 2 | $2 \times 10^6$ | | 0.600 | $3.6 \times 10^5$ | $4.3 \times 10^4$ |
| 3 | $5 \times 10^6$ | $6.56 \times 10^5$ | 0.400 | $1.6 \times 10^5$ | $2.4 \times 10^4$ |
| 4 | $10 \times 10^6$ | $1.9 \times 10^5$ | 0.249 | $0.6 \times 10^5$ | $1.7 \times 10^4$ |
| 5 | $2 \times 10^6$ | $17.5 \times 10^5$ | 0.494 | $2.44 \times 10^5$ | $3.08 \times 10^4$ |
| 6 | $5 \times 10^6$ | $2.78 \times 10^5$ | 0.323 | $1.04 \times 10^5$ | $2.1 \times 10^4$ |
| 7 | $10 \times 10^6$ | $0.974 \times 10^5$ | 0.217 | $.47 \times 10^5$ | $1.0 \times 10^4$ |
| 8 | $1 \times 10^8$ | $0.294 \times 10^5$ | | | $2.49 \times 10^3$ |

[1] $M_w{}^i = [n] \times 10^3$.
[2] End group (Smogyi method), $$[n] = \lim_{C \to 0} \left( \frac{n - n_0}{n_0 C} \right)$$

where
$C$ = concentration in percent.
$n$ = coefficient of viscosity of solution.
$n_0$ = coefficient of viscosity of solvent.

Comparison of the results contained in Table I clearly indicate that maximum yields of dextran having average molecular weights within the clinical range are obtained with doses within the range of $10^6$ to $10^8$ Roentgen units.

It will be apparent to those skilled in the art that by my invention a new and improved method has been obtained for preparing dextran fractions meeting the clinical requirements established by the Bureau of Standards. This is substantiated by mouse toxicity tests on dextran which had received a dose of $5 \times 10^7$ Roentgen units. There were no deaths in the ten mice tested.

It will be readily realized that other forms of electron accelerating apparatus may be employed instead of high voltage accelerating apparatus 1. For example, linear accelerators of the type described by J. C. Slater in the "Reviews of Modern Physics," vol. 20, No. 3, pp. 473–518 (July 1948) may be utilized. In general, the energy of the electrons employed in the practice of the invention may range from about 50,000 electron volts to 20 million electron volts or higher, depending upon the depth to which it is desired to irradiate the native dextran. To decrease wasteful energy absorption between the point of exit from the accelerating apparatus and the polymeric compositions, a vacuum chamber having thin entrance and exit windows may be inserted in the space.

Although present use is being made, for clinical purposes, of a dextran fraction having a weight average molecular weight within the range of 25,000 to 100,000 it may be possible to use the entire irradiated product containing fractions which per se are either of too high or too low molecular weight. Such fractions, in accordance with the present methods, are discarded. Accordingly, it is intended to include within the scope of this invention the preparation of a dextran fraction which may be used clinically without additional processing. Thus, in a one step process, it would be possible to irradiate native dextran in a polyethylene container and simultaneously effect degradation of the native dextran, sterilization of the degraded product and cross-linking of the polyethylene container. Such a container would have greatly improved form stability at elevated temperatures and greatly improved solvent resistance. The methods for effecting cross-linking of polyethylene containers by irradiation so as to improve their form stability at elevated temperatures and solvent resistance are more particularly described and claimed in the copending application of E. J. Lawton et al. Serial No. 324,552, filed December 6, 1952, and assigned to the assignee of the present invention. The sterilization effect of high energy electrons is now well known to the art.

What I claim as new and desire to secure by Letters Patent of the United States is:

1. In the process of preparing dextran having an average molecular weight within the clinically useful range, the steps which comprise irradiating native dextran having a weight average molecular weight within the range of several million to several hundred million with a dose of high energy electrons possessing an energy equivalent to at least 50,000 electron volts of the order of $10^6$ to $10^8$ Roentgen units, and thereafter separating from said irradiated dextran a dextran fraction having a weight average molecular weight in the 25,000 to 100,000 range.

2. In the process of preparing a low molecular weight dextran useful in the manufacture of clinical dextran, the steps which comprise irradiating native dextran having a weight average molecular weight within the range of several million to several hundred million with a dose of high energy electrons possessing an energy equivalent to at least 50,000 electron volts to a radiation dose of the order of $10^6$ to $10^8$ Roentgen units and thereafter by fractional precipitation separating from said irradiated dextran a fraction of dextran having a weight average molecular weight within the range of 25,000 to 100,000.

References Cited in the file of this patent

UNITED STATES PATENTS

| 2,534,222 | Brasch | Dec. 19, 1950 |
| 2,602,751 | Robinson | July 8, 1952 |

FOREIGN PATENTS

| 665,263 | Great Britain | Jan. 23, 1952 |

OTHER REFERENCES

Saeman et al.; Ind. and Eng. Chem., vol. 44 (Dec. 1952), pages 2848–2851.

Little: Nature, vol. 170 (Dec. 20, 1952), pages 1075–1076.

Lawton et al.: Nature, vol. 172 (Juyl 11, 1953), pages 76–77.

Engineering Research Institute, U. of Michigan, Project M943 (Aug. 31, 1951), Progress Report I. (A. E. C. Chicago 80, Ill.), pp. 28, 29, 33, 34, 35, 44, 45, 46, and 47.

Chemical Abstracts, 39, column 31903.

B. Ingelman and K. Siegbahn; Arkiv. Kemi, Mineral, Geol., 18 B, No. 1, 6 pp., 1944.

Manufacturing Chemist, November 1952, pages 451 to 455.

Wolff et al.: Industrial and Engineering Chemistry, pages 755–759, April 1953.